(12) United States Patent
Dryer et al.

(10) Patent No.: US 8,165,933 B2
(45) Date of Patent: Apr. 24, 2012

(54) SYSTEMS, METHODS, AND COMPUTER PROGRAM PRODUCTS FOR PERFORMING ITEM LEVEL TRANSACTION PROCESSING

(75) Inventors: Eric Dryer, Charlotte, NC (US); George Miller Abernethy, Charlotte, NC (US); Ronald Hollander, Walnut Creek, CA (US); Lowell Robert Huff, Manchester, MO (US); Sean Kang, McKinney, TX (US); Clarence E. Lee, Mansfield, TX (US); Eric Scott Sandoz, Concord, CA (US); Jeffrey Robert Woodside, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 368 days.

(21) Appl. No.: 12/126,707

(22) Filed: May 23, 2008

(65) Prior Publication Data

US 2009/0292628 A1 Nov. 26, 2009

(51) Int. Cl.
*G07B 17/00* (2006.01)
*G07F 19/00* (2006.01)
(52) U.S. Cl. ......................................................... 705/30
(58) Field of Classification Search ....................... 705/30
See application file for complete search history.

(56) References Cited

U.S. PATENT DOCUMENTS

| | | | |
|---|---|---|---|
| 5,151,948 A | | 9/1992 | Lyke et al. |
| 6,018,717 A * | | 1/2000 | Lee et al. ........................ 705/13 |
| 6,757,664 B1 * | | 6/2004 | Cardinal et al. ................ 705/38 |
| 6,877,661 B2 * | | 4/2005 | Webb et al. ............. 235/462.01 |
| 7,062,456 B1 | | 6/2006 | Riehl et al. |
| 7,069,244 B2 * | | 6/2006 | Strayer et al. ................... 705/39 |
| 7,248,855 B2 * | | 7/2007 | Joyce et al. .................... 455/406 |
| 7,249,097 B2 * | | 7/2007 | Hutchison et al. .............. 705/39 |
| 7,383,230 B2 * | | 6/2008 | Wolff .............................. 705/53 |
| 2003/0105686 A1 * | | 6/2003 | Dang et al. ...................... 705/31 |
| 2003/0171145 A1 * | | 9/2003 | Rowe ............................. 463/25 |
| 2003/0212573 A1 | | 11/2003 | Dorrance et al. |
| 2005/0240531 A1 * | | 10/2005 | Wolff, Jr. ........................ 705/53 |
| 2009/0119209 A1 * | | 5/2009 | Sorensen et al. ............... 705/40 |

FOREIGN PATENT DOCUMENTS

WO WO 98/04992 2/1998

OTHER PUBLICATIONS

Visa Announces Three Strategic Alliances in Electronic Banking PR Newswire, May 23, 1994.*
European Search Report dated Aug. 11, 2009 for European Application No. EP 09 25 1377.

* cited by examiner

*Primary Examiner* — Matthew Gart
*Assistant Examiner* — Seye Iwarere
(74) *Attorney, Agent, or Firm* — Ryan P. Harris; Moore & Van Allen PLLC

(57) ABSTRACT

The present invention provides systems, methods, and computer program products for performing validation and clearance at a transaction item level for transaction received in a batch format. Each transaction of the batch is stored separately in a storage system, such as a logical database. Typically, image data and electronic data for a transaction are stored separately in the storage system and may be linked to each other. Each transaction is separately accessible and/or updateable. Each transaction stored in the storage system is separately analyzed to validate that the transaction is at least balanced. Transactions that determined to be balanced are cleared irrespective of a balance status associated with other transactions associated with the batch of transactions, such that transactions are individually cleared as opposed to being cleared in a batch format.

37 Claims, 6 Drawing Sheets

SYSTEMS, METHODS, AND COMPUTER PROGRAM PRODUCTS FOR PERFORMING ITEM LEVEL TRANSACTION PROCESSING

BACKGROUND OF THE INVENTION

1. Field of the Invention

The present invention relates generally to systems, methods, and computer program products for bank transaction processing, and more particularly to performing validation and clearance of bank transactions associated with a batch of transactions on an individual transaction basis, as opposed to a batch processing basis.

2. Description of the Related Art

The advent of electronic bank transaction processing has significantly decreased the time and cost required for clearance and posting of bank transactions. Systems have been developed that are capable of capturing image data from financial documents. The image data are then processed to determine financial terms listed in the documents. This processed data can then be used to balance, clear, and post transactions.

For example, in the past, a simple transaction such as a deposit made by an account holder could be time consuming and costly to process. If an account holder submitted several third party checks they had received along with a deposit slip, a bank employee would need to enter information regarding each third party check electronically, such as the amount, payor, and payee. The check would then need to be input into a system for reading check ID, account and routing data associated with the check, etc. The bank employee would verify that the totals for the check received as part of the deposit reconcile with the amount entered on the deposit slip by the account holder. Only after the debits and credits for a transaction were reconciled could the transaction be made available for clearance and posting.

Using current technology, however, image data needed for balancing, clearing, and posting transactions may be scanned from each check in a transaction. The image data are then processed to "recognize" and validate the captured image data as financial information, check ID information, and routing information. This information is then used to balance, clear and post the transaction.

While strides have been made in bank transaction processing, further improvements are still needed. Specifically, many financial institutions employ batch transaction processing, which can delay clearance and posting of individual transactions, as well as increase cost and needlessly delay clearance of important transactions.

In particular, some banking systems store various transactions for processing into a common batch. The transactions are processed as a batch, and only after all transactions in the batch have been balanced is the batch made available for clearance and posting. For example, as illustrated in FIG. 1, in a conventional transaction processing system 10, a batch 12 comprising two (2) transactions $14_a$-$14_b$ are initially processed to "recognize" and validate information on the financial documents in the transactions and then determine if the debits and credits of each transaction 14 in the batch are balanced. (See blocks 16-18). As illustrated at block 20, one of the transactions $14_a$ is balanced; however, transaction $14_b$ is not. In this instance, both transactions $14_a$-$14_b$ are delayed due to the batch nature of the process while the unbalanced transaction is investigated and balanced. As such, an unnecessary delay is experienced regarding the balanced transaction $14_a$ as illustrated in the figure by the time line T. This problem is exacerbated where the balanced transaction $14_a$ that is being delayed is a high value transaction for which the financial institution could benefit from earlier clearance and posting or where earlier availability of the transaction for clearance would allow the financial institution to use a lower cost processing system or where the transaction is critical to the account holder and requires expedited processing.

BRIEF SUMMARY OF THE INVENTION

The systems, methods, and computer program products of the present invention provide various embodiments for processing bank transactions. In particular, the systems, methods, and computer program products of the present invention facilitate processing of transactions associated with a batch of transactions in an individualized manner. As each transaction in the batch is determined to be "recognized", validated, and balanced, the transaction is made available for clearance and posting regardless of the status of other transactions in the batch. This, in turn, allows for more efficient processing of transactions, ensures that transactions are not unnecessarily delayed for clearance and posting, and allows for individual access, updating and reporting of transactions.

For example, in one embodiment, the present invention provides a system for processing transactions in a financial system. The system comprises a storage system comprising stored therein two or more transactions, wherein each transaction comprises associated debits and credits, and wherein two or more transactions are associated with a same batch of transactions. A transaction validation system is associated with the storage system. The translation validation system is at least capable of determining whether each of the transactions in the batch is individually balanced based on the debits and credits associated with the transaction. The translation validation system is also typically capable of "recognizing" image data from financial instruments in the transaction and validating the image data prior to performing balancing of the various financial instruments in the transaction.

A transaction clearing system is also associated with the storage system. The transaction clearing system is capable of accessing the storage system and clearing transactions in the batch that have been determined to be balanced by the transaction validation system irrespective of a balance status associated with other transactions associated with the batch of transactions. Specifically, in some embodiments, the transaction clearing system clears transactions in the batch of transactions while other transactions in the batch remain unbalanced. In this manner, transactions comprised in a batch are generally processed more efficiently and not unnecessarily delayed due to problems with balancing of other transactions in the same batch.

Depending on the embodiment, either the transaction validation system may push balanced transactions to the transaction clearing system, or the transaction clearing system may periodically query the storage device for transactions that are balanced and eligible for clearance and posting.

In some embodiments, the storage system is a logical database. In this embodiment, transactions are individually stored in the logical database. At least some of the transactions are each individually accessible and individually capable of update. In some embodiments, there may be both image and electronic data associated with a transaction. In this instance, the image and electronic data may be stored separately in the database but linked together. In some embodiments, both the image data and electronic data associated with a transaction and stored in the logical database are capable of concurrent update.

In general, the logical database of this embodiment is accessible by various processing systems to perform transaction validation and balancing. For example, the database is accessible for storing image and electronic data for financial instruments associated with transactions. The database is also accessible to perform various processes on the image data, such as character recognition and data perfection of the image data to recognize and/or repair characters recognized in the data and validation of the recognized data to other electronic data related to the financial instrument such as magnetic ink code recognition (MICR) information. The database is also accessible for review of a transaction in the database relative to a review of an associated account holder's account balance, perform risk assessment regarding the transaction, provide notifications to account holders associated with transactions, generate reports, detect duplicate payments by an account holder, etc. Further, the database is accessible by various systems for clearance and posting of transactions. Access and use of the database is typically dictated by a rules engine indicating various processing rules for processing transactions stored in the database. As such, the database of this embodiment provides storage for various transactions and allows access to the transactions by various processes used to validate, balance, and clear the transactions.

In some embodiments, the transaction clearing system is capable of prioritizing clearance of transactions based on one or more of the cost for clearing the transaction, deadlines associated with a transaction, or value of the transaction. As such, the transactions may be cleared and posted in a manner that is beneficial to the financial institution.

In addition to the above described systems, the present invention also provides methods and computer program products that implement processing of bank transactions in a manner such that transactions that are considered balanced are made available for clearance and posting independent of the status of other transactions in a batch of transactions.

DETAILED DESCRIPTION OF THE INVENTION

Figure 1:
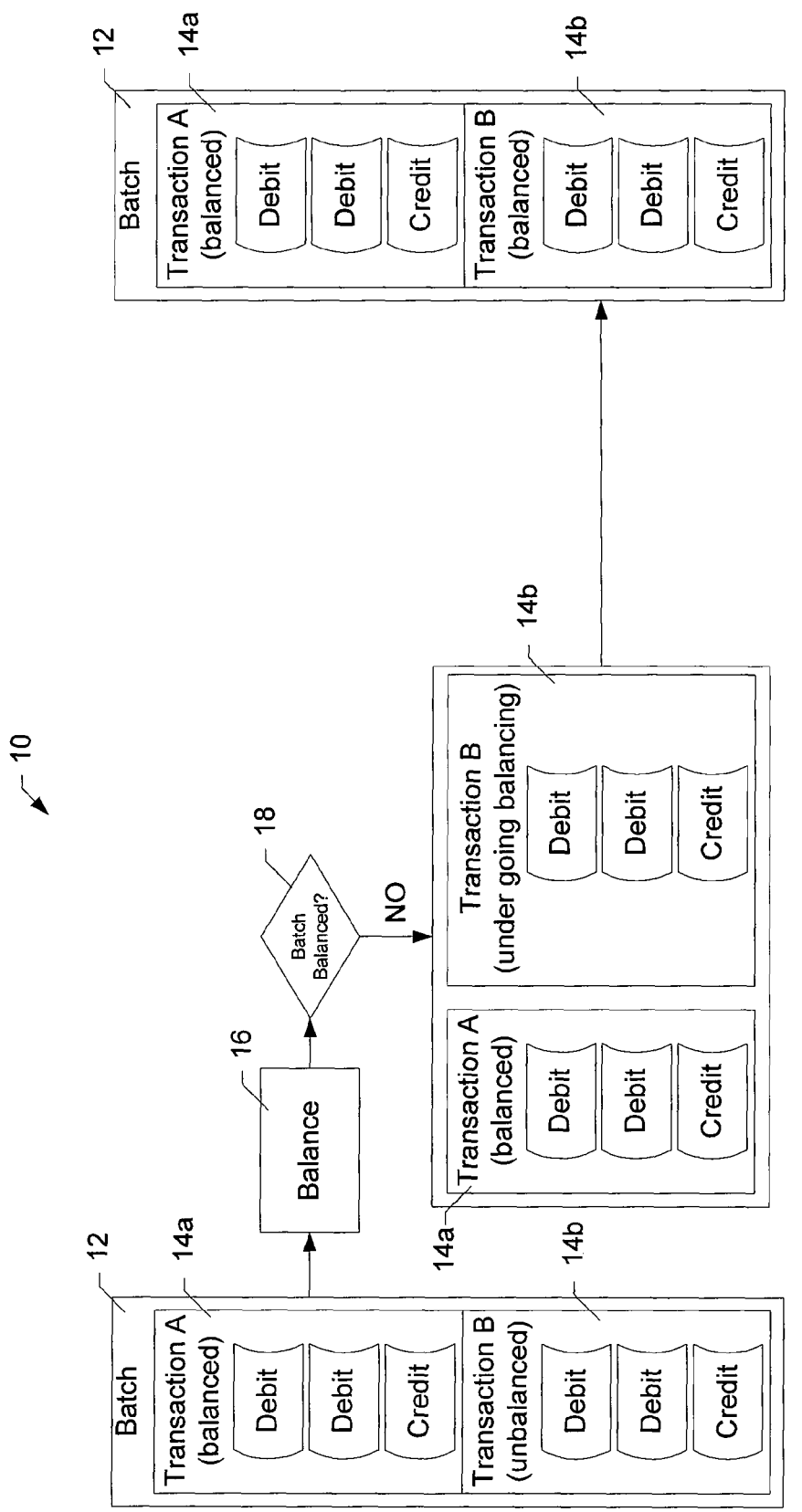
FIG. 1 is an operation flow diagram illustrating a conventional process flow for processing financial transactions in a batch process.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

In general terms, the present invention provides systems, methods, and computer program products for processing financial transactions for clearance and posting in a financial system. The systems, methods, and computer program products of the present invention access a storage system comprising two or more transactions that are part of a batch of transactions. The transactions have been separate from the batch and individually stored in the storage system for independent access and processing. The systems, methods, and computer program products determine which transactions are balanced and in a form for clearance. These transactions are then made available for clearance while other transactions in the storage system associated with the same batch of transactions are currently undergoing balancing, such that transactions are made available in a more timely manner for clearance.

Figure 2:
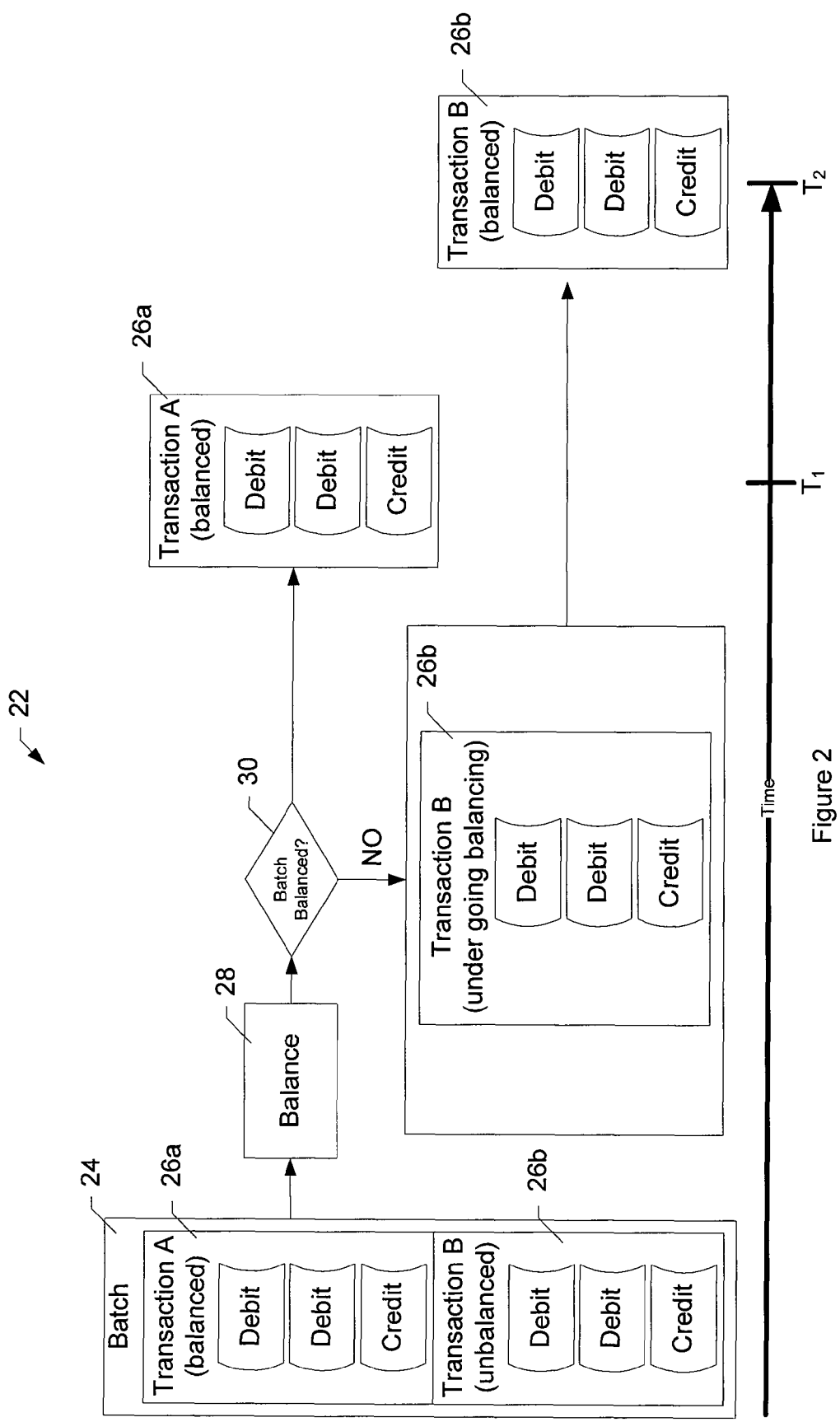
FIG. 2 is an operation flow diagram illustrating a process flow for processing a financial transaction according to one embodiment of the present invention.

FIG. 2 is an operational flow diagram depicting an example process flow for a batch of transactions processed using the systems, methods, and computer program products according to one embodiment of the present invention. As illustrated in this system 22, a batch 24 is provided comprising a plurality of transactions $26_a$-$26_b$. Each transaction comprises a series of debits and credits that should balance. Each of the transactions of batch is individually stored in a storage system. Each of the transactions is initially processed to determine if the debits and credits of each transaction 26 in the batch are balanced. (See blocks 28-30). As illustrated, one of the transactions $26_a$ is quickly validated and determined to be balanced and has been made available for clearance posting at time $T_1$. However, one of the transactions $26_b$ has experienced delay in the validation and balance process. The unbalanced transaction $26_b$ is retained and further processed until it is balanced. At which point the remaining transaction $26_b$ is also released for clearance at time $T_2$.

As illustrated in FIG. 2, transaction $26_a$ was found to be balanced and was made available for clearance sooner than the transaction $26_b$ requiring further operations. In this manner, the systems, methods, and computer program products decrease the delay time for processing many transactions. This, in turn, provides various advantageous as it allows for transactions to be efficiently processed for clearance and posting, such that transactions are needlessly delayed by the validation and balancing process. As transactions are individually stored in the storage system, transaction-level tracking and reporting is also possible.

The systems, methods, and computer program products can be used to process various types of financial instruments. The systems, methods, and computer program products of the present invention are useful where significant delays in validation and/or balancing of transactions may occur, such as where the transactions include image data that must be recognized and validated prior to balancing, such as check deposits, check payments, etc.

Figure 3:
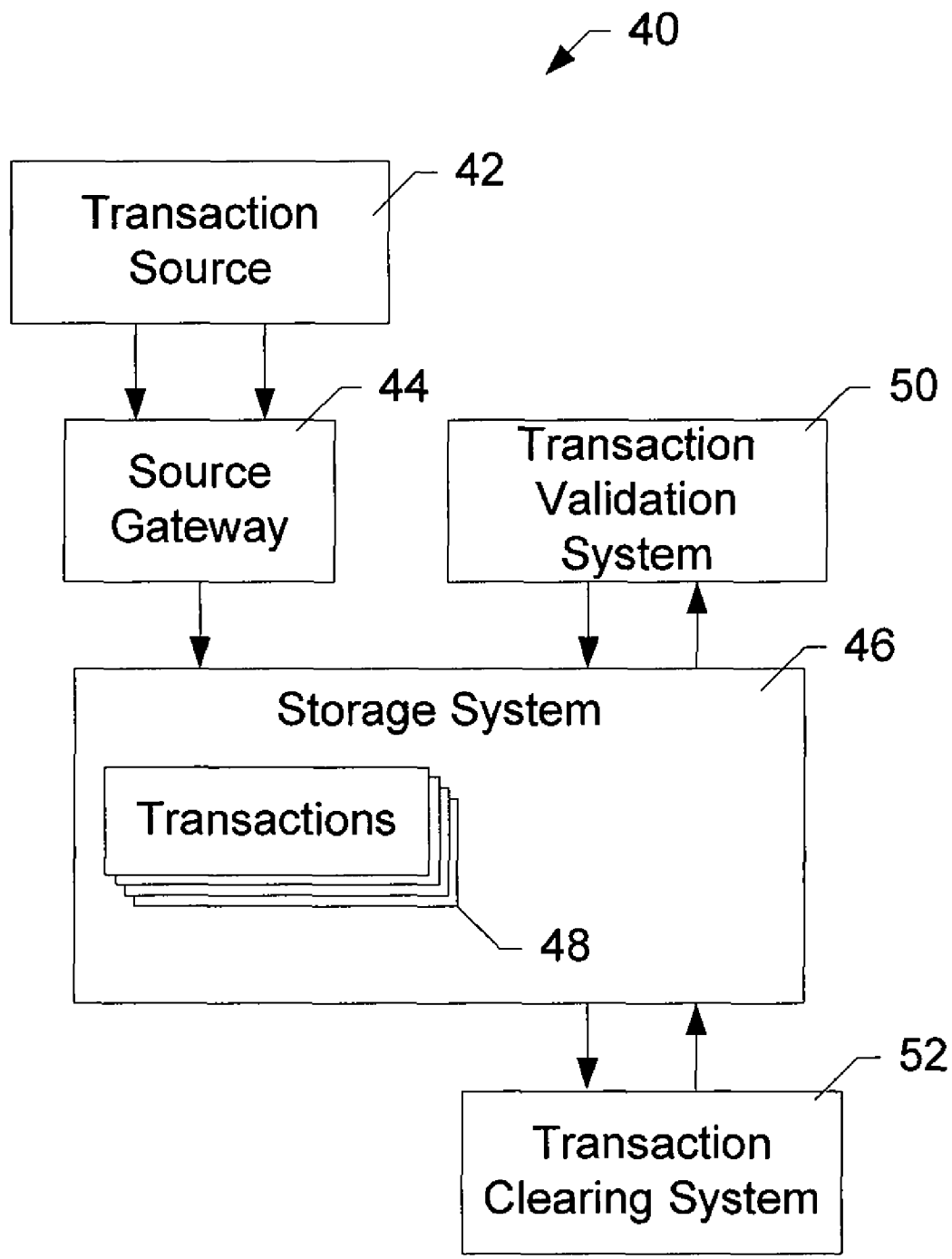
FIG. 3 is a generalized diagram illustrating system level operation for processing transactions according to one embodiment of the present invention.
Figure 4:
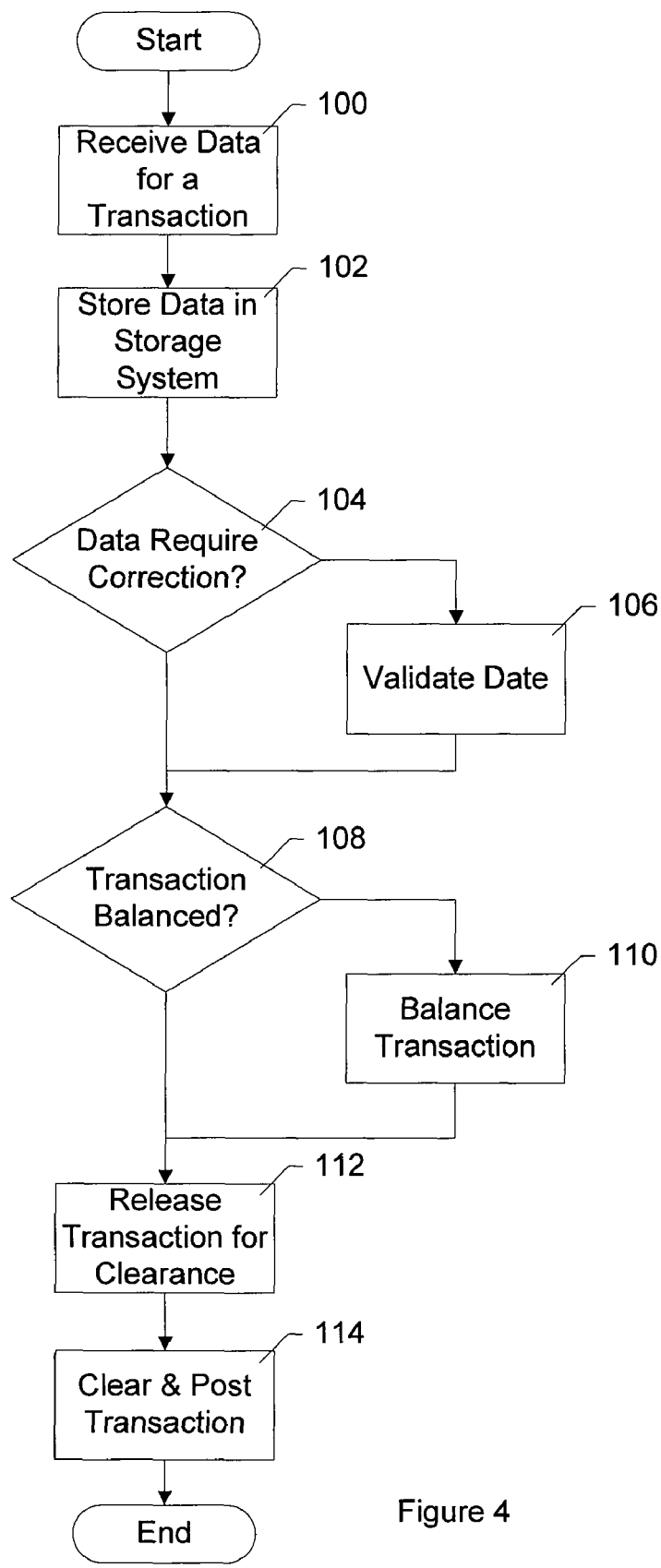
FIG. 4 is an operation flow diagram illustrating processing transactions according to the embodiment depicted in FIG. 3.

FIG. 3 is a generalized process block diagram providing a generalized depiction of the invention according to one embodiment of the present invention, and FIG. 4 is an operational block diagram illustrating processing of transactions in the system depicted in FIG. 3. Note that for simplicity the description below only relates to processing transactions involving deposit of checks or other paper financial instruments, but as further disclosed in FIGS. 5 and 6, the systems, methods, and computer program products are not limited to processing of such financial instruments, but may be used for other forms of transactions.

As illustrated, transactions 48 are input to the system 40 from various sources 42. (See FIG. 4, block 100). In this embodiment, the transactions involve deposit of checks or other financial instruments in paper form. Each transaction includes both credits and debits associated with the transaction, such as for example a plurality of third party checks and a deposit slip submitted by an account holder for deposit into the account holder's account. The input data includes both electronic data and image data. Sources of such data include remote image capture (RIC), high speed capture, image cash letter (ICL), deposits, lock boxes, returns and vaults. Image and electronic data are received for a plurality of transactions in the form of a batch. The batch is provided to source gateway processor 44, which is capable of splitting the transactions from the batch for individual storage. Image and electronic data for each transaction is stored in the storage system 46. (See FIG. 4, block 102). For example, the source gateway processor separates the received images into individual image files for each financial instrument in the transaction for storage.

Once in the storage system 46, the transactions 48 are available for validation and balancing by a transaction validation system 50. The transaction validation system comprises various processes or modules for correcting and validating image data associated with a transaction, if necessary. For example, the transaction clearing system comprises modules for performing character recognition and data perfection of the image data to recognize and/or repair characters recognized in the image data and validation of the recognized image data to other electronic data related to the financial instrument such as magnetic ink code recognition (MICR) information. (See FIG. 4, block 104 and 106).

Following validation of the data associated with a transaction, the transaction may then be processed by the transaction validation system 50 to determine whether it is balanced. (See FIG. 4, block 108). Transactions that are not balanced are submitted to various processes and/or modules in an attempt to determine the reason for the unbalance and correct same or notify a bank representative and/or account holder regarding the issue. (See FIG. 4, block 110). Balanced transactions are either flagged as balanced or pushed to the transaction clearing system 52, where they are eventually cleared and posted. (See FIG. 4, blocks 112 and 114). Depending on the embodiment, the transaction clearing system may use various rules/criteria for clearing and posting the transactions, such as routing to a selected clearing channel, selection of clearing channel based on pricing, expedited clearing of higher value transactions, expedited clearing of transactions that are more beneficial to the financial institution and/or the account holder.

In this manner, financial transactions are received, validated, balanced, cleared and posted according to one embodiment of the present invention. In particular, the storage system 46, for each financial instrument in each transaction, stores and links image data for a financial instruments with its associated electronic data, such as for example, MICR data and other unique data (such as origin, ABA routing data, perfection and correction data status, etc.). Captured images are routed through a gateway that separate the images into individual items and stores them in the database. The images and associated electronic data are examined and perfected (quality inspected, repaired, recognized, and validated), and then made available for clearing. The transactions are then cleared based on selected channel routing and selected distribution between clearance channels.

Figure 5:
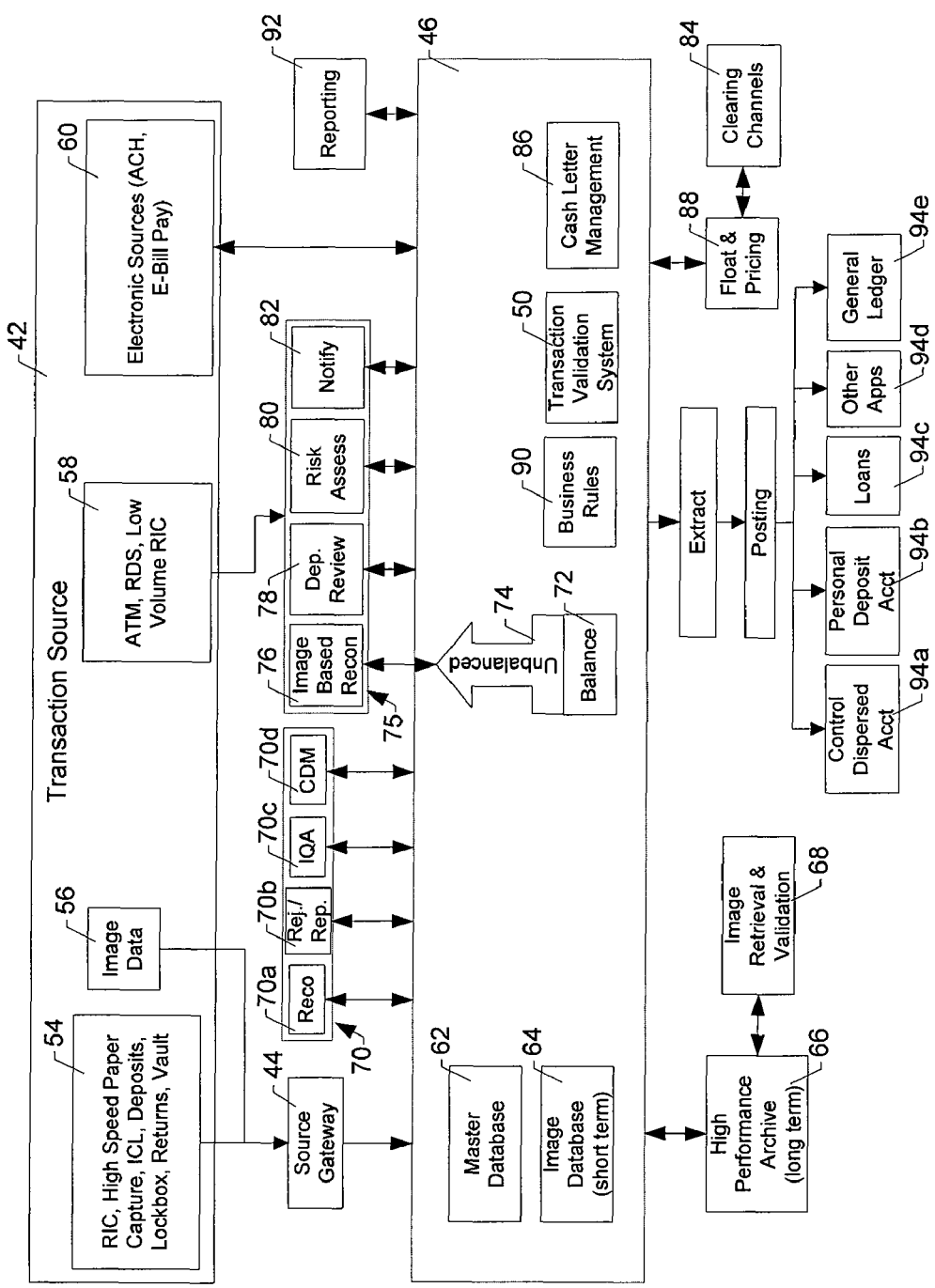
FIG. 5 is a more specific illustration of one implementation of the system illustrated in FIG. 3 according to one embodiment of the present invention.
Figure 6:
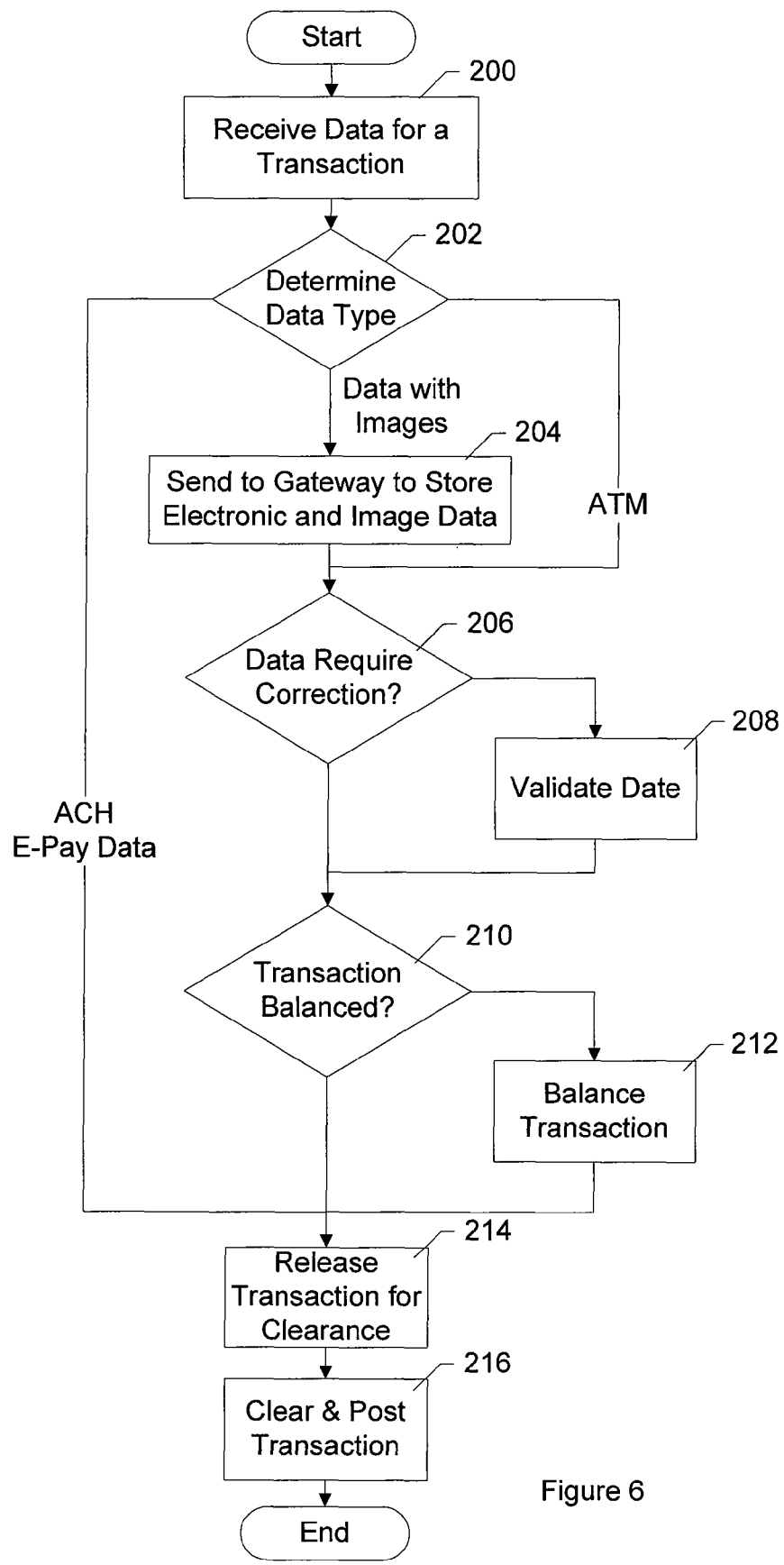
FIG. 6 is an operation flow diagram illustrating processing transactions according to the embodiment depicted in FIG. 5.

FIG. 5 is a generalized process block diagram providing a depiction of the invention according to one embodiment of the present invention, and FIG. 6 is an operational block diagram illustrating processing of transactions in the system depicted in FIG. 5. Specifically, FIG. 5 depicts a detailed embodiment of the present invention for processing various forms of transactions. In this embodiment, the transaction validation system and transaction clearing system are depicted as various modules and processes for performing the functions described above with FIGS. 3 and 4.

As illustrated, the systems, methods, and computer program products of this embodiment receive transaction information from various sources 42. These sources include various deposits 54 including financial instruments in paper form, such as remote image capture (RIC), high speed capture, image cash letter (ICL), deposits, lock boxes, returns and vaults. Image data 56 for financial instruments is also provided with such deposits. Other sources of data are via ATMs, remote deposits, and low volume RICs 58 and from automated clearing house (ACH), electronic bill pay, direct deposits, etc. 60.

As illustrated in FIG. 5, the storage system 46 of this embodiment is a logical database. The storage system allows for various systems, modules, and processes to access and update records in the database. The storage system includes one or more databases 62 and 64 for storing image and electronic data for each transaction. In some embodiments, the system may further include archival and long term storage 66, as well as image retrieval and validation module 68.

Various data perfection modules 70 are associated with the storage system 46 for correcting and perfecting image data associated with transactions. For example, recognition module 70a is used for character recognition. A reject/repair module 70b, analyzes the characters from the recognition module to determine the character or send it to an operator for review. An image quality analysis (IQA) module 70c determines the quality of the captured image and may provide indications regarding image quality. A code line data match (CDM) module 70d compares data extracted from the image with data read from the MICR to determine whether there is a match or any discrepancies in the data. Essentially, the data perfection modules 70 are used to recognize and validate image data associated with a paper financial instrument in a transaction, such as paper checks and deposit slips.

Associated with the storage system is the transaction validation system 50 for performing validation and balancing of the transactions. It is noted here that FIG. 5 illustrates various module for performing various transaction validation and balancing operations. These modules are depicted for informational purposes. It understood that these various modules are performed by one or more processors associated with the transaction validation system 50.

Associated with the storage system are a balancing module 72 and a transaction validation module 74. If a transaction is determined to be out of balance, the transaction is subjected to further processing. Specifically, the transaction may be processed through one or more of the following balancing modules 75: 1) imaged based recognition module 76 to determine issues with image data, 2) deposit review module 78 to determine whether there are balance issues with the account holder associated with the transaction's account, 3) a risk assessment module 80 to assess possible risk with the account associated with the unbalanced transaction or the transaction itself, and 4) a customer notification module 82 to indicate to either a bank employee and/or the account holder that the transaction is imbalanced.

Further associated with the storage system is a cash letter module 86 for generation of cash letters for clearance and posting of transactions that have been determined to be balanced. A float and pricing module 88 may also be provided for determining which channel 84 to use for clearance and posting of the transactions. In one embodiment, the float and pricing module is essentially a rules engine that routes a transaction to a specific clearance channel based on various parameters, such as processing cost, delay for processing, and/or value of the transaction.

An important aspect of the storage system of this embodiment is the inclusion of a business rules module 90. The business rules module 90 dictates access and updating a transaction data in the storage system. Further, the business rules module 90 dictates the various processes performed on transactions to recognize, validate, and balance transactions. In this manner, where the storage system is a logical database, the business rules module 90 dictates use of the logical database for processing the transactions.

Other modules that may be provided include an information reporting module 92 for tracking and reporting on transactions. As the storage system of this embodiment stores the transactions into separate records, transaction-level tracking and reporting is possible.

While the float and pricing module is used to route transactions to channels for clearance, some transactions are designated for clearance and posting to internal accounts, such as control dispersed accounts 94a, personal deposit accounts 94b, payment of loans 94c, general ledger 94d, or other applications 94e.

Regarding FIG. 6, in operation, various sources of data are received. (See FIG. 6, block 200). The transactions are routed differently based on the type of data. (See FIG. 6, block 202). For deposits comprising paper form financial instruments, the image 56 and electronic data 54 for each financial instrument in a given transaction is provided to the source gateway 44, which receives the data and stores same in the storage system 46. (See FIG. 4, block 204). For example, the source gateway processor receives a batch of transactions and separates the batch into individual transactions. For each transaction, the gateway processor separates the received images into individual image files for each financial instrument in the transaction for storage. Electronic data are stored in database 62, while image data are stored in database 64.

Transaction data from electronic sources 60, such as automated clearing house (ACH), electronic bill pay, direct deposits, etc. are previously validated and processed 96 and are stored in the storage system and flagged as balanced and available for clearance and posting. (See FIG. 6, block 214).

Referring again to transactions that include image and electronic data, such as transactions involving deposit of checks, following storage of the data (see FIG. 6, block 204), the transactions are individually processed to validate the image and electronic data via the various data perfection modules 70, if necessary. (See FIG. 6, block 206). These modules perform character recognition 70a, reject/repair character data 70b, perform image quality analysis (IQA)

70c, and/or perform a code line data match (CDM) 70d with the data extracted from the image with data read from the MICR to determine whether there is a match or any discrepancies in the data.

Following validation of the transaction data, the transactions are analyzed to determine if they are balanced. (See FIG. 6, block 210). Transactions that are balanced are flagged as balanced and made available for clearance and posting. (See FIG. 6, block 214). Transactions that are determined to not be balanced are provided to balancing modules 75. (See FIG. 6, block 212). Various processes are performed on the unbalanced transactions, such as image recognition of image data to reconcile data discrepancy issues. The system may perform deposit review to determine whether there are balance issues with the account holder associated with the transaction's account and perform risk assessment of the account associated with the unbalanced transaction or the transaction itself. The system may also notify either one or both a bank employee and/or the account holder that the transaction is imbalanced. If and once the transaction is balanced, it is then made available for clearance and posting. (See FIG. 6, blocks 214 and 216).

As an example, an account holder may submit a transaction comprising a series of third party checks and a deposit slip in which the account holder has incorrectly totaled the deposit slip. This transaction would be submitted within a batch of other transactions. The image data for each of the checks and deposit slip would be stored in the storage system. Electronic data associated with the checks and deposit slip, such as check ID, ABA routing information, MICR data, etc. would also be stored in the database. (See FIG. 6, block 204). The data for the various checks and deposit slip may undergo data validation to ensure data perfection. (See FIG. 6, block 206). The transaction will then be determined to be imbalanced (see FIG. 6, block 210) and submitted for further processing due to the discrepancy between the deposit slip and the check totals. (See FIG. 6, block 212). This discrepancy may either be corrected electronically or routed to bank personnel for review and correction. A notice may also be provided to the account holder regarding the imbalance. Once the transaction has been validated and balanced, it is then made available for clearance and posting. (See FIG. 6, blocks 214 and 216).

As illustrated and discussed above, the systems, methods, and computer program products of the present invention are capable of reducing processing time and cost for clearing and posting financial transactions. The systems, methods, and computer program products improve control, tracking, and reporting on a transaction-level basis, and simplify architecture and shared resources. A significant burden on transaction processing systems is reduced.

It is noted here that the embodiment illustrated in FIG. 5 discloses various modules and processes performed for transaction validation, balancing, clearance and posting. The embodiment of FIG. 3 illustrates a more general embodiment illustrating generalized systems, such as translation validation systems and translation clearance systems. It is understood that any processes or modules depicted in FIG. 5 relating to validation of transactions and balancing of transactions are under the general umbrella of the transaction validation system, while any processes or modules relating to clearance and posting of transactions are under the general umbrella of the transaction clearance system.

The present invention can be implemented as a method, as a system, as computer instruction codes, as an apparatus and/or combinations of any of the above. Some of the claims of the application may be drafted in means-plus-function format. While the means recited in these claims can be implemented by any number of systems, devices, computer program code, etc., provided below are examples of structural systems that may meet the functions outlined by the recited means.

For example, the means for storing transaction information, validating and balancing transactions, and clearing and posting transactions, determining routing for clearing transactions, generating reports, etc., can be implemented as a processor or general computing element that uses software code instructions to perform these functions. The processor could, as an alternative, be an application specific IC chip that it hard-wired to perform the stated functions. The various means could also be met by a distributed network of processing elements that perform various portions of the recited functions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for processing transactions in a financial system comprising:

a memory device having computer readable program code store thereon; and a processing device operatively coupled to the memory device, wherein the processing device is configured to execute the computer readable program code for operating a storage system, a transaction validation system, and a transaction clearing system; and wherein said storage system comprising stored therein two or more transactions, wherein each transaction comprises associated debits and credits, and wherein two or more transactions are associated with a same batch of transactions;

said transaction validation system is associated with said storage system, wherein said transaction validation system is at least capable of determining whether each of the transactions within the batch is individually balanced based on the debits and credits associated with the transaction; and said transaction clearing system is associated with said storage system for clearing transactions in the batch that have been determined to be balanced by said transaction validation system irrespective of a balance status associated with other transactions associated with the batch of transactions, wherein said transaction clearing system clears transactions in the batch of transactions while other transactions in the batch remain unbalanced.

2. A system according to claim 1, wherein two or more transactions in the batch are related to each other and wherein said transaction clearing system waits until each of the related transactions are balanced before clearing the related transactions.

3. A system according to claim 1, wherein said transaction validation system determines whether each transaction in the batch is balanced, and designates which of the transactions are balanced.

4. A system according to claim 1, wherein said transaction validation system is further capable of transmitting unbalanced transactions to a system or entity for balancing.

5. A system according to claim 1, wherein said transaction clearing system periodically queries said storage system to determine transactions that are balanced and available for clearing.

6. A system according to claim 1, wherein said transaction validation system indicates to said transaction clearing system transactions that are balanced and available for clearing.

7. A system according to claim 1, wherein said storage system is a logical database.

8. A system according to claim 1, wherein said storage system stores transactions such that each transaction is individually accessible and capable of individual update.

9. A system according to claim 1, wherein at least one transaction stored in said storage system comprises both image data and electronic data associated with the transaction, and wherein said storage system stores both the image data and electronic data such that the image data and electronic data are linked to each other.

10. A system according to claim 9, wherein said transaction validation system is capable of concurrently updating image data and electronic data for a transaction in said storage system.

11. A system according to claim 9, wherein said storage system stores electronic data for a transaction wherein the electronic data comprises one or more items selected from the group consisting of origin, routing information, and correction status.

12. A system according to claim 1, wherein said transaction clearing system prioritizes clearance of transactions based on one or more of the cost for clearing the transaction, deadlines associated with a transaction, or value of the transaction.

13. A system according to claim 1, wherein said storage system stores transactions, wherein the transactions are one or more of check deposits, lock box transactions, or credit card payments.

14. A computer-implemented method for processing transactions in a financial system comprising:
   accessing, via a computing device processor, a storage system comprising stored therein two or more transactions, wherein each transaction comprises associated debits and credits, and wherein two or more transactions are associated with a same batch of transactions;
   validating, via a computing each of the transactions by determining whether each transaction within the batch is individually balanced based on the debits and credits associated with the transaction; and
   clearing, via a computing device processor, transactions in the batch that have been determined to be balanced irrespective of a balance status associated with other transactions associated with the batch of transactions, wherein said clearing transactions in the batch includes clearing one or more transactions in the batch while other transactions in the batch remain unbalanced.

15. A method according to claim 14, wherein two or more transactions in the batch are related to each other and wherein said clearing transactions comprises waiting until each of the related transactions are balanced before clearing the related transactions.

16. A method according to claim 14, wherein said validating each of the transactions comprises determining whether each transaction in the batch is balanced, and designating which of the transactions are balanced.

17. A method according to claim 14 further comprising transmitting unbalanced transactions to a system or entity for balancing.

18. A method according to claim 14, wherein said clearing transactions comprises periodically querying the storage system to determine transactions that are balanced and available for clearing.

19. A method according to claim 14 further comprises indicating transactions that are balanced and available for clearing.

20. A method according to claim 14, wherein accessing a storage system comprises individually accessing transactions in the storage system.

21. A method according to claim 14 further comprising individually updating a transaction in the storage system.

22. A method according to claim 14, wherein at least one transaction comprises both image data and electronic data associated with the transaction, and wherein said method further comprises storing both the image data and electronic data in the storage system such that the image data and electronic data are linked to each other.

23. A method according to claim 22 further comprising concurrently updating image data and electronic data for a transaction in the storage system.

24. A method according to claim 14, wherein said clearing transactions comprises clearing transactions based on one or more of the cost for clearing the transaction, deadlines associated with a transaction, or value of the transaction.

25. A method according to claim 14, wherein said clearing transaction comprises clearing transactions that are one or more of check deposits, lock box transactions, or credit card payments.

26. A computer program product for processing transactions in a financial system, the computer program product including a non-transitory computer-readable medium having computer program code embodied therein, the computer program code comprising:
   instructions for accessing a storage system comprising stored therein a storage system comprising stored therein two or more transactions, wherein each transaction comprises associated debits and credits, and wherein two or more transactions are associated with a same batch of transactions;
   instructions for validating each of the transactions by determining whether each transaction within the batch is individually balanced based on the debits and credits associated with the transaction; and
   instructions for clearing transactions in the batch that have been determined to be balanced irrespective of a balance status associated with other transactions associated with the batch of transactions, wherein said instructions for transaction clearing comprises instructions for clearing one or more transactions in the batch of transactions while other transactions in the batch remain unbalanced.

27. A computer program product of claim 26, wherein two or more transactions in the batch are related to each other and wherein said instructions for clearing transactions comprises instructions for waiting until each of the related transactions are balanced before clearing the related transactions.

28. A computer program product of claim 26, wherein said instructions for validating each of the transactions comprises instructions for determining whether each transaction in the batch is balanced, and instructions for designating which of the transactions are balanced.

29. A computer program product of claim 26, further comprising instructions for transmitting unbalanced transactions to a system or entity for balancing.

30. A computer program product of claim 26, wherein said instruction for clearing transactions comprises instructions for periodically querying the storage system to determine transactions that are balanced and available for clearing.

31. A computer program product of claim 26 further comprises instructions for indicating transactions that are balanced and available for clearing.

32. A computer program product of claim 26, wherein said instructions for accessing a storage system comprises instructions for individually accessing transactions in the storage system.

33. A computer program product of claim 26 further comprising instructions for individually updating a transaction in the storage system.

34. A computer program product of claim 26, wherein at least one transaction comprises both image data and electronic data associated with the transaction, and wherein said method further comprises instructions for storing both the image data and electronic data in the storage system such that the image data and electronic data are linked to each other.

35. A computer program product of claim 34 further comprising instructions for concurrently updating image data and electronic data for a transaction in the storage system.

36. A computer program product of claim 26, wherein said instructions for clearing transactions comprises instructions for clearing transactions based on one or more of the cost for clearing the transaction, deadlines associated with a transaction, or value of the transaction.

37. A computer program product of claim 26, wherein said instructions for clearing transactions comprises instructions for clearing transactions that are one or more of check deposits, lock box transactions, or credit card payments.

* * * * *